US012328255B2

(12) United States Patent
Filsfils et al.

(10) Patent No.: US 12,328,255 B2
(45) Date of Patent: *Jun. 10, 2025

(54) SEGMENT ROUTING NETWORK SIGNALING AND PACKET PROCESSING

(71) Applicant: Cisco Technology, Inc., San Jose, CA (US)

(72) Inventors: Clarence Filsfils, Brussells (BE); Zafar Ali, Hicksville, NY (US); Syed Kamran Raza, Kanata (CA); Ahmed Refaat Bashandy, Milpitas, CA (US); Nagendra Kumar Nainar, Morrisville, NC (US); Carlos M. Pignataro, Cary, NC (US); Jaganbabu Rajamanickam, Stittsville (CA); Rakesh Gandhi, Stittsville (CA); Bhupendra Yadav, Kanata (CA); Faisal Iqbal, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,878

(22) Filed: Dec. 5, 2023

(65) Prior Publication Data

US 2024/0113962 A1 Apr. 4, 2024

Related U.S. Application Data

(63) Continuation of application No. 17/811,570, filed on Jul. 8, 2022, now Pat. No. 11,863,435, which is a
(Continued)

(51) Int. Cl.
*H04L 45/00* (2022.01)
*H04L 41/0246* (2022.01)
(Continued)

(52) U.S. Cl.
CPC .......... *H04L 45/34* (2013.01); *H04L 41/0246* (2013.01); *H04L 43/106* (2013.01);
(Continued)

(58) Field of Classification Search
CPC ... H04L 41/0246; H04L 43/106; H04L 45/02; H04L 45/20; H04L 45/304; H04L 45/34;
(Continued)

(56) References Cited

U.S. PATENT DOCUMENTS 6,658,480 B2 12/2003 Boucher et al.
7,197,008 B1 3/2007 Shabtay et al.
(Continued)

FOREIGN PATENT DOCUMENTS

EP 2690821 A1 1/2014
GB 2420244 A 5/2006

OTHER PUBLICATIONS

Bates T., et al., "Multiprotocol Extensions for BGP-4," Network Working Group, Request for Comments: 4760, Jan. 2007, pp. 1-12.
(Continued)

*Primary Examiner* — Stephen J Clawson
(74) *Attorney, Agent, or Firm* — Polsinelli P.C.

(57) ABSTRACT

In one embodiment, a service chain data packet is instrumented as it is communicated among network nodes in a network providing service-level and/or networking operations visibility. The service chain data packet includes a particular header identifying a service group defining one or more service functions, and is a data packet and not a probe packet. A network node adds networking and/or service-layer operations data to the particular service chain data packet, such as, but not limited to, in the particular header. Such networking operations data includes a performance metric or attribute related to the transport of the particular service chain packet in the network. Such service-layer
(Continued)

operations data includes a performance metric or attribute related to the service-level processing of the particular service chain data packet in the network.

20 Claims, 11 Drawing Sheets

Related U.S. Application Data continuation of application No. 16/675,083, filed on Nov. 5, 2019, now Pat. No. 11,388,088, which is a continuation of application No. 15/841,276, filed on Dec. 13, 2017, now Pat. No. 10,469,367.

(60) Provisional application No. 62/567,823, filed on Oct. 4, 2017.

(51) Int. Cl.
*H04L 43/106* (2022.01)
*H04L 45/02* (2022.01)
*H04L 45/302* (2022.01)
*H04L 45/741* (2022.01)
*H04L 101/659* (2022.01)

(52) U.S. Cl.
CPC .............. *H04L 45/02* (2013.01); *H04L 45/20* (2013.01); *H04L 45/304* (2013.01); *H04L 45/741* (2013.01); *H04L 2101/659* (2022.05)

(58) Field of Classification Search
CPC ..... H04L 45/741; H04L 45/03; H04L 45/033; H04L 45/036; H04L 45/037; H04L 45/0377; H04L 2101/659; H04L 43/0852; H04L 43/10
See application file for complete search history.

(56) References Cited

U.S. PATENT DOCUMENTS

| | | |
|---|---|---|
| 7,961,636 B1 | 6/2011 | Barach et al. |
| 9,444,675 B2 | 9/2016 | Guichard et al. |
| 9,525,627 B2 | 12/2016 | Padgett et al. |
| 9,537,769 B2 | 1/2017 | Bryant et al. |
| 9,762,488 B2 | 9/2017 | Previdi et al. |
| 9,806,962 B2 | 10/2017 | Guichard et al. |
| 9,912,577 B2 | 3/2018 | Filsfils et al. |
| 10,063,463 B2 | 8/2018 | Saad et al. |
| 10,063,475 B2 | 8/2018 | Previdi et al. |
| 10,153,951 B2 | 12/2018 | Guichard et al. |
| 10,158,568 B2 | 12/2018 | Gage |
| 10,277,471 B2 | 4/2019 | Ubaldi et al. |
| 10,382,334 B2 | 8/2019 | Previdi et al. |
| 2001/0037397 A1 | 11/2001 | Boucher et al. |
| 2003/0023710 A1 | 1/2003 | Corlett et al. |
| 2003/0112748 A1 | 6/2003 | Puppa et al. |
| 2003/0221015 A1 | 11/2003 | Basso et al. |
| 2004/0054813 A1 | 3/2004 | Boucher et al. |
| 2004/0139237 A1 | 7/2004 | Rangan et al. |
| 2005/0099949 A1 | 5/2005 | Mohan et al. |
| 2006/0155532 A1 | 7/2006 | Nam et al. |
| 2006/0215582 A1 | 9/2006 | Castagnoli et al. |
| 2007/0036080 A1* | 2/2007 | Addeo .................... H04L 45/50 |
| | | 370/241.1 |
| 2007/0115986 A1 | 5/2007 | Shankara |
| 2007/0206503 A1 | 9/2007 | Gong et al. |
| 2007/0280247 A1 | 12/2007 | Mera et al. |
| 2008/0101241 A1 | 5/2008 | Mohan et al. |
| 2008/0313364 A1 | 12/2008 | Flynn et al. |
| 2011/0093946 A1 | 4/2011 | Chen |
| 2011/0222412 A1 | 9/2011 | Kompella |
| 2015/0256456 A1 | 9/2015 | Previdi et al. |
| 2015/0263892 A1 | 9/2015 | John et al. |
| 2015/0381444 A1* | 12/2015 | Nainar ................ H04L 43/0811 |
| | | 370/241.1 |
| 2016/0021162 A1 | 1/2016 | Surcouf et al. |
| 2016/0099853 A1 | 4/2016 | Nedeltchev et al. |
| 2016/0254991 A1 | 9/2016 | Eckert et al. |
| 2016/0337264 A1* | 11/2016 | Murashko ............... H04L 67/63 |
| 2016/0352620 A1 | 12/2016 | Schmutzer et al. |
| 2017/0250907 A1 | 8/2017 | Pignataro et al. |
| 2017/0250908 A1 | 8/2017 | Nainar et al. |
| 2017/0310569 A1 | 10/2017 | Clemm et al. |
| 2017/0324622 A1 | 11/2017 | Ubaldi et al. |
| 2017/0366456 A1 | 12/2017 | Dara et al. |

OTHER PUBLICATIONS

Bates T., et al., "Multiprotocol Extensions for BGP-4," RFC 2283, Feb. 1998, The Internet Society, Reston, VA, USA, 9 pages.
Cisco Systems, Inc., "Cisco 10000 Series Router Control Plane Policing—Platform Enhancement," San Jose, CA, Apr. 2008, 24 Pages.
Deering S., et al., "Internet Protocol, Version 6 (IPv6) Specification," RFC 8200, Jul. 2017, The Internet Society, Reston, VA, USA, 42 pages.
Deering S., et al., "Internet Protocol, Version 6 (IPv6) Specification," rfc2460.txt, Internet Protocol, Version 6 (IPV6) Specification, Internet Engineering Task Force, IETF, Standard, Internet Society (ISOC) 4, Rue Des Falaises CH-1205 Geneva, Switzerland, Dec. 31, 1998, 39 pages, XP015008244.
Edgeworth B., et al., "IP Routing on Cisco IOS, IOS XE, and IOS XR: How a Router Works," An Essential Guide to Understanding and Implementing IP Routing Protocols, Chapter 3, Cisco Press, Indianapolis, Jan. 2, 2015, 16 Pages.
Extended European Search Report for European Application No. 22160328.5, mailed Jun. 1, 2022, 9 Pages.
Filsfils C., et al., "Segment Routing Architecture draft-ietf-spring-segment-routing-11," Network Working Group, The Internet Society, Internet-Draft, Reston, VA, USA, Feb. 16, 2017, pp. 1-28.
Filsfils C., et al., "Segment Routing Architecture draft-ietf-spring-segment-routing-12," Network Working Group, The Internet Society, Reston, VA, USA, Jun. 20, 2017, pp. 1-28.
Filsfils C., et al., "SRv6 Network Programming draft-filsfils-spring-srv6-network-programming-01," Cisco Systems, Inc., Spring, The Internet Society, Reston, VA, USA, Jun. 28, 2017, pp. 1-42.
Filsfls C., et al., "SRv6 Network Programming; draft-filsfils-spring-srv6-network-programming-00," The Internet Society, Mar. 9, 2017, Reston, VA, USA, 41 Pages.
International Preliminary Report on Patentability for International Application No. PCT/US2018/054463, mailed Apr. 16, 2020, 10 Pages.
International Search Report and Written Opinion for International Application No. PCT/US2018/054463, mailed Dec. 12, 2018, 12 Pages.
International Standard, "Information Technology—Telecommunications and Information Exchange Between Systems—Intermediate System to Intermediate System Intra-domain Routeing Information Exchange Protocol for Use in Conjunction With the Protocol for Providing the Connectionless-mode Network Service (ISO 8473)," Second Edition, ISO/IEC 2002, Switzerland, Nov. 15, 2002, 210 Pages.
Previdi S., et al., "IPv6 Segment Routing Header (SRH) draft-ietf-6man-segment-routing-header-06.txt," Internet Engineering Task Force (IETF), Standard Working Draft, Internet Society (ISOC) 4, Rue Des Falaises CH—1205 Geneva, Switzerland, Mar. 13, 2017, pp. 1-35, XP015118521.
Rekhter Y., et al., "A Border Gateway Protocol 4 (BGP-4)," Network Working Group, RFC 4271, Reston, VA, USA, Jan. 2006, pp. 1-104, https://www.rfc-editor.org/rfc/rfc4271.
Rosen E., et al., "Multiprotocol Label Switching Architecture," Network Working Group, Request for Comments: 3031, Jan. 2001, pp. 1-61.

* cited by examiner

SEGMENT ROUTING NETWORK SIGNALING AND PACKET PROCESSING

CROSS-REFERENCE TO RELATED APPLICATIONS

This application is a continuation of U.S. application Ser. No. 17/811,570, filed on Jul. 8, 2022, which is in turn a continuation of U.S. application Ser. No. 16/675,083, filed on Nov. 5, 2019, now U.S. Pat. No. 11,388,088 granted Jul. 12, 2022, which is in turn, is a continuation of U.S. patent application Ser. No. 15/841,276, filed Dec. 13, 2017, now U.S. Pat. No. 10,469,367 granted Oct. 16, 2019, which in turn, claims the priority to U.S. Provisional Application No. 62/567,823, filed Oct. 4, 2017, both of which are hereby incorporated by reference in their entirety.

TECHNICAL FIELD

The present disclosure relates generally to sending of packets through a packet network, such as, but not limited to, according to segment routing of packets through a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network forwarded based one or more values representing network nodes or paths.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
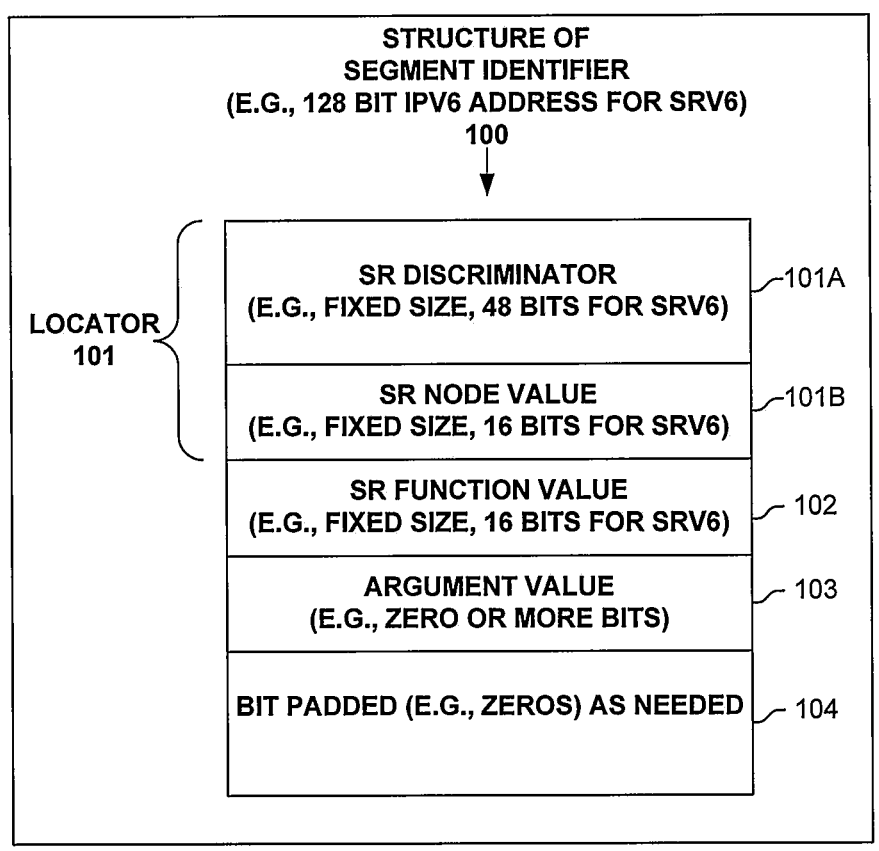
FIG. 1A illustrates a segment identifier structure according to one embodiment.

Disclosed are, inter alia, methods, apparatus, computer-storage media, mechanisms, and means associated with segment routing (SR) network processing of packets including operations signaling and processing of packets in manners providing processing and/or memory efficiencies.

Aspects of the invention are set out in the independent claims and preferred features are set out in the dependent claims. Features of one aspect may be applied to each aspect alone or in combination with other aspects.

One embodiment includes receiving a particular segment routing packet by a particular router in a network. Responsive to the particular router data plane ascertaining during fast path processing by a fast path processing unit based on an Operations, Administration, and Maintenance (OAM) segment identifier of the particular segment routing packet that the particular segment routing packet is to be OAM processed by a different processing unit in the particular router, the particular segment routing packet is communicated to the different processing unit, with fast path processing being hardware-based packet processing by the fast path processing unit. OAM processing of the particular segment routing packet is performed by the different processing unit.

In one embodiment, the OAM segment identifier includes a locator portion identifying to perform said OAM processing. In one embodiment, the OAM segment identifier includes an identification of an END.OP endpoint with punt function.

In one embodiment, responsive to the OAM segment identifier identifying timestamp behavior, the fast path processing unit communicating a timestamp of a current time along with the particular segment routing packet to the different processing unit. In one embodiment, the OAM segment identifier includes an identification of an END.OTP endpoint with timestamp and punt function. In one embodiment, the OAM segment identifier includes an identification of END.OTPF endpoint with punt and forward function.

In one embodiment, in response to an Internet Control Message Protocol (ICMP) echo request packet encapsulated in the particular segment routing packet, the particular router sending an ICMP echo response packet corresponding to the ICMP echo request. In one embodiment, the different processing unit is part of slow path packet processing responsive to programmed instructions, wherein slow path packet processing is packet processing based on programmed instructions; and wherein the different processing unit creates the ICMP echo response packet or provides the ICMP echo request packet to an ICMP service running on the particular router.

In one embodiment, said OAM processing includes sending the timestamp and identifying information of the particular segment routing packet via the network to a remote OAM processing unit. One embodiment includes: another segment router in the network particular OAM processing of the particular segment routing packet, including sending to the remote OAM processing unit another timestamp and packet identifying information related to the particular segment routing packet; the remote OAM processing unit receiving and processing the timestamp and said identifying information and said another timestamp and said packet identifying information and to determine an OAM result including delay, loss, segment routing path verification, or jitter.

In one embodiment, a segment list of a segment routing header of said received particular segment routing packet includes the OAM segment identifier. In one embodiment, the OAM segment identifier is a 128-bit Internet Protocol (IP) version 6 (IPv6) routable address; and wherein the particular segment routing packet includes an IPv6 header that comprises the OAM segment identifier as a destination address of the IPv6 header.

One embodiment includes an apparatus, comprising: one or more hardware interfaces sending and receiving packets with a network; a fast path packet processing unit performing hardware-based packet processing; and a slow path packet processing unit performing processor-based packet processing based on programmed instructions. The apparatus performs packet processing operations including segment routing-capable (SR-capable) packet processing operations, with said packet processing operations including: receiving a particular segment routing packet; responsive to the particular router data plane ascertaining during fast path processing by the fast path processing unit based on an Operations, Administration, and Maintenance (OAM) segment identifier of the particular segment routing packet that the particular segment routing packet is to be OAM processed by the slow path processing unit in the particular router, communicating the particular segment routing packet to the slow path processing unit, with fast path processing being hardware-based packet processing by the fast path processing unit; and OAM processing of the particular segment routing packet by the slow path processing unit.

In one embodiment, the OAM segment identifier includes an identification of an END.OP endpoint with punt function.

In one embodiment, the OAM segment identifier includes an identification of an END.OTP endpoint with punt function or the OAM segment identifier includes an identification of END.OTPF endpoint with punt and forward function; and wherein responsive to the OAM segment identifier identifying timestamp behavior, the fast path processing unit communicating a timestamp of a current time along with the particular segment routing packet to the different processing unit.

2. Example Embodiments

Disclosed are, inter alia, methods, apparatus, computer-storage media, mechanisms, and means associated with segment routing (SR) network processing of packets including operations signaling and processing of packets in manners providing processing and/or memory efficiencies. As used herein segment routing (SR) includes, but is not limited to using Internet Protocol Version 4 or 6 (IPv4 or IPv6) addresses as segment identifiers (SIDs). Further, SR includes, but is not limited IPv6 SR (SRv6) and/or IPv4 (SRv4). A segment identifier is typically a routable address in the network, such as, but not limited to an IPv4 or IPv6 address.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The term "route" is used to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. As used herein, "forwarding information" includes, but is not limited to, information describing how to process (e.g., forward, send, manipulate, modify, change, drop, copy, duplicate, receive) corresponding packets.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc.

Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1A illustrates a segment identifier structure 100 according to one embodiment. As shown, locator 101 identifies the segment routing node (e.g., router) to which segment identifier 100 pertains. In one embodiment segment identifier, locator 101 is a single value. In one embodiment, locator 101 includes a segment routing (SR) discriminator portion 101A (some fixed value of a small number of possible values) and a segment node value 101B, which allows a smaller search space for locator 101 as the dynamic portion is SR node value 101B. Segment identifier 100 also includes SR function value 102, argument value 103 (if present), and bit padding 104. Using a known bit padding value 104 (e.g., all zeros or all ones for simplicity) allows for exact matching of a complete segment identifier 100. In one embodiment, each of SR discriminator 101A, SR node value 101B, and SR function value 102 is a fixed size and located in a corresponding fixed position in the highest-order bits of segment identifier 100.

Thus, the structure of segment identifier 100 allows a SR-capable node to efficiently extract any of the desired fields 101A, 101B, 102 and 103, possibly using exact matching instead of a more resource consuming longest prefix matching operation. This includes a SR node (corresponding to SR node value 101B) performing the segment routing processing (corresponding to SR function value 102) which includes accessing argument value 103 (qualify this segment routing processing) at a corresponding fixed position within segment identifier 100, rather than acquiring such as via an additional read or parsing operation if argument value 103 was located elsewhere (e.g., at the end of segment identifier 100).

In one embodiment, segment identifier 100 is a routable IPv6 128-bit address, such as with a sixty-four bit SR discriminator 101A, a sixteen-bit SR node value 101B, a sixteen-bit SR function value 102, and an argument value 103 of zero or more bits qualifying the processing identified by SR function value 102.

In one embodiment, an OAM segment identifier 100 includes a local SR function value 102 determined by the SR node (corresponding to locator 101) to signal particular OAM functionally. Thus, this OAM segment identifier 100 is only locally valid, as another SR node may use a different SR function value 102 for the same OAM processing.

In one embodiment, an OAM segment identifier 100 includes a global segment routing function value 102 (e.g., SRv6 FUNC opcode), with an opcode value globally identifying particular OAM processing to multiple or all SR nodes in the network. Thus any node can signal via the global segment routing function value 102 to cause another network node to perform corresponding OAM functionality. Using a global value provides for efficient signaling to a remote node to perform particular OAM processing.

Figure 1B:
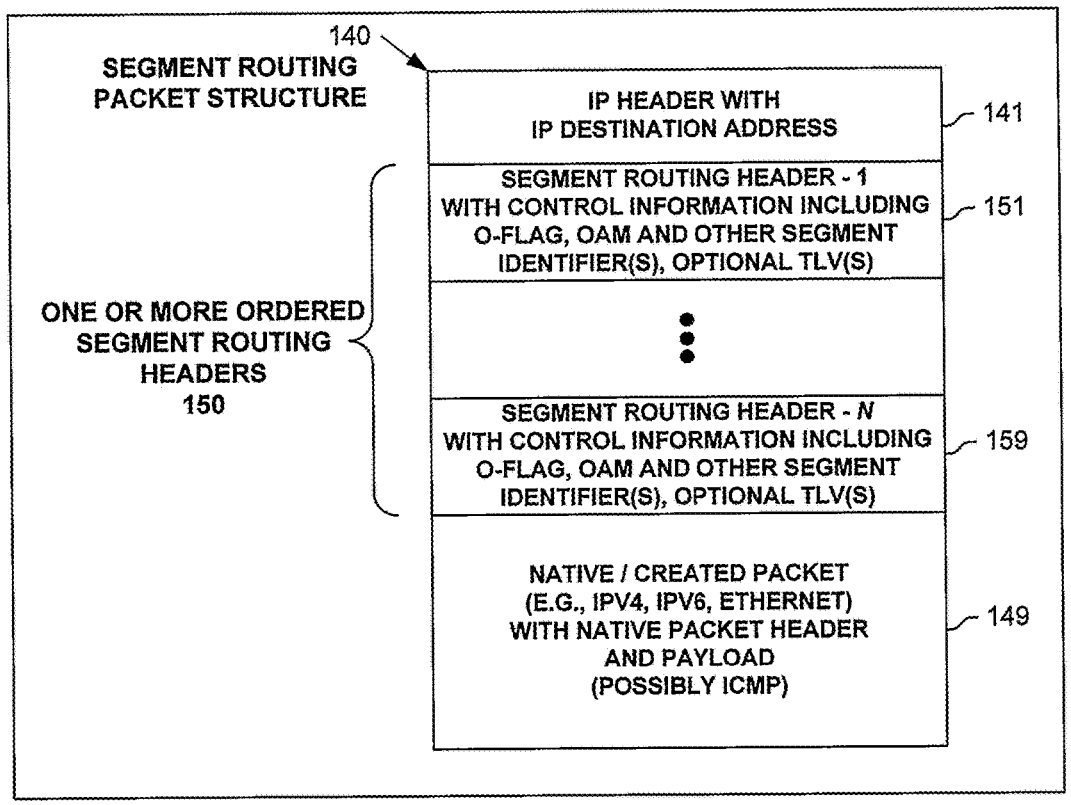
FIG. 1B illustrates a segment routing (SR) packet structure according to one embodiment.

FIG. 1B illustrates a segment routing packet structure 140 according to one embodiment. As shown, SR packet structure 140 includes an IP header 141 (e.g., IPv6, IPv4) including an IP destination address (which typically is a segment identifier), one or more ordered segment routing headers 150, and the native (encapsulated) packet 149. Each of one or more ordered SR headers 150 (which includes SR headers 151-159) typically includes one or more segment identifiers. By allowing multiple, typically smaller SR headers, SR packet format 140 provides processing and/or memory efficiencies especially for limited-capability (e.g., less memory, less processing power) SR routers. In one embodiment, a SR packet with only a single segment identifier has no segment routing header 150.

As shown, one or more ordered SR headers 150 includes one to n SR headers 151-159, with n being a positive integer. Each of these ordered SR headers 151-159 includes an ordered list of one or more segment identifiers (e.g., IPv6 or IPv4 address), each representing a segment in the SR network used to process (e.g., forward, manipulate, modify) a SR packet in and through the SR network.

Figure 2A:
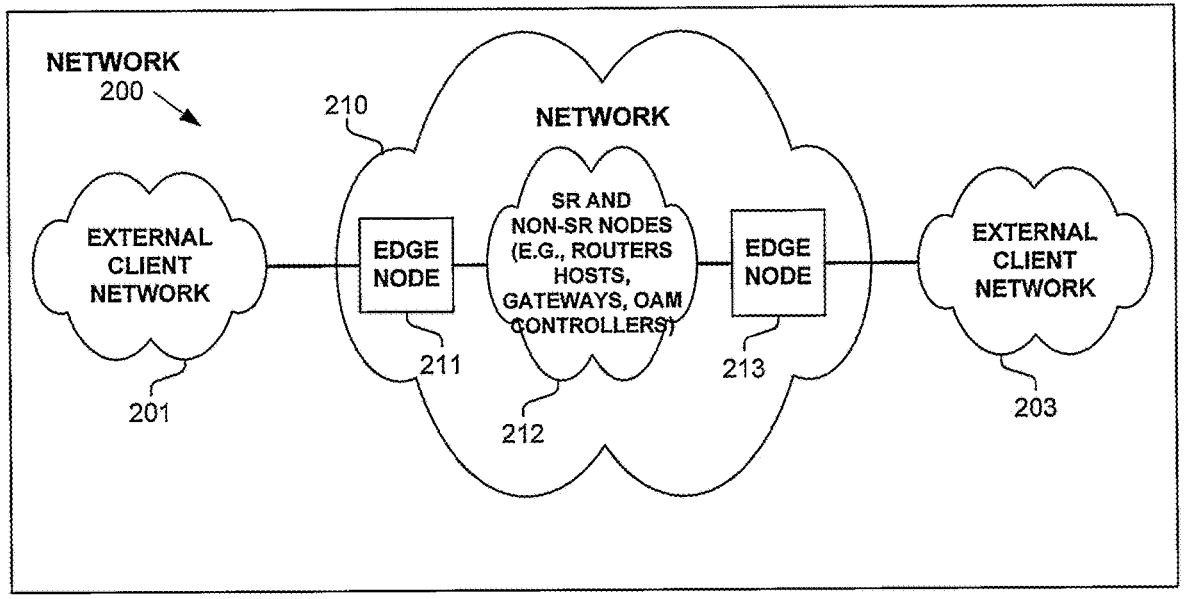
FIG. 2A illustrates a network operating according to one embodiment.

FIG. 2A illustrates network 200 operating according to one embodiment. As shown, network 200 includes client networks 201 and 203 (which are the same network in one embodiment) external to segment routing (SR) network 210, which includes SR edge nodes 211 and 213 and a network 212 of network nodes including SR-capable routers (and possibly some network nodes that are not SR-capable in that they do not process a segment routing header/segment identifier but can forward/route IP and/or other packets), SR gateways, and OAM controller(s). In one embodiment, SR edge nodes 211 and 213 typically encapsulate native packets received from networks 201 and 203 into SR packets according to a data plane ascertained SR policy, and subsequently decapsulate native packets from SR packets and forward the native packets into network 201 and 203.

In response to receiving a packet, a SR edge node 211, 213 and/or a SR node within network 212 determines a SR policy (e.g., list of segment identifiers) through and/or to which to forward a SR packet, possibly identifying OAM functionality via one or more (global or local) OAM segment identifiers and/or to set or clear the O-Flag in a segment routing header. These policies can change in response to network conditions, network programming, etc. In one embodiment, the SR policy specifies to add one or more SR headers or simply one or more segment identifiers, resulting in a SR packet having one or more SR headers, each with one or more segment identifiers and in one embodiment, with OAM signaling.

In one embodiment, a native packet is received without a SR header, and the SR node 211, 213 (or possibly an SR-capable node within network 212) encapsulates the native packet in a SR packet including one or more added SR headers, each including one or more segment identifiers (e.g., one or more OAM and/or non-OAM segment identifiers), and possibly other OAM signaling information (e.g., an OAM flag set or cleared, a time length value (TLV) indicating OAM signaling, etc.)

In one embodiment, a SR packet is received with a SR header, with a SR node 211, 213 (or possibly an SR-capable node within network 212) adding one or more SR headers resulting in a SR packet including one or more added SR headers, each including one or more segment identifiers. In one embodiment, a single SR header could have been used that includes all of the segment identifiers and other OAM signaling information, if present.

Figure 2B:
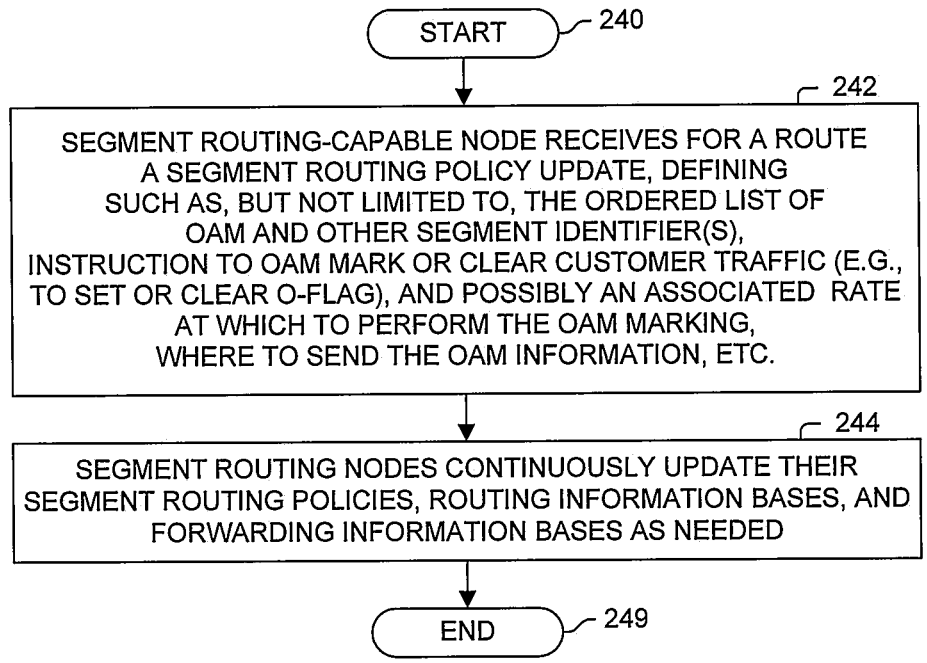
FIG. 2B illustrates a process according to one embodiment.

FIG. 2B illustrates a process associated with distributing segment routing policies according to one embodiment, with these segment routing policies designating OAM signaling to be included in corresponding segment routing packets. Processing begins with process block 240. In process block 242, a segment routing-capable node receives for a route, a segment routing policy update defining such as, but not limited to, an ordered list of OAM and other segment identifier(s), instruction to OAM mark or clear customer traffic (e.g., to set or clear an O-Flag in a segment routing header), an associated rate at which to perform the OAM marking, and/or where to send the OAM information, etc. In process block 244, segment routing nodes continuously update their segment routing policies, routing information bases, and forwarding information bases as needed. Processing of the flow diagram of FIG. 2B is complete as indicated by process block 249.

Figure 2C:
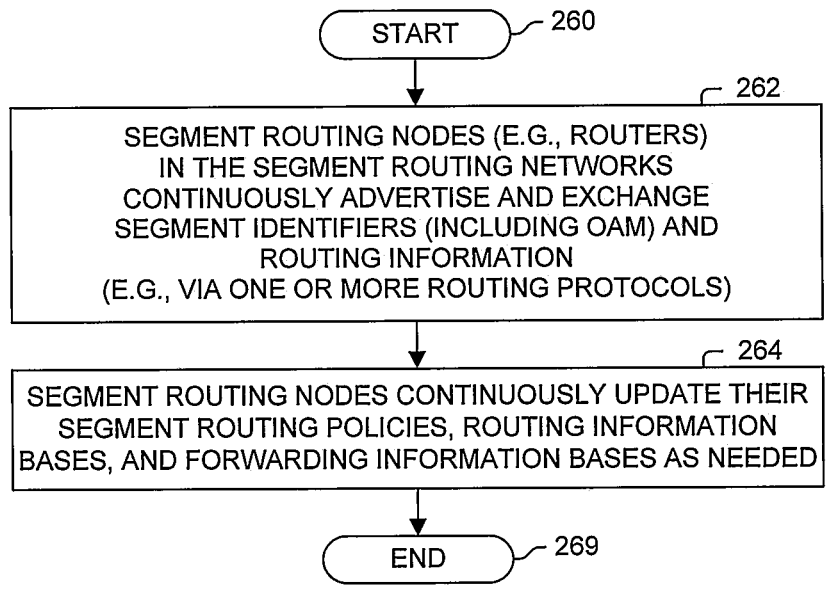
FIG. 2C illustrates a process according to one embodiment.

FIG. 2C illustrates a process according to one embodiment associated with distributing segment routing information including OAM and non-OAM segment identifiers in a network. Processing begins with process block 260. In process block 262, SR routers in the SR networks continuously advertise and exchange segment routing information (e.g., including advertising routes of segment identifiers) and other routing information (e.g., IPv4 or IPv6 topology information) via one or more routing protocols and/or via one or more label distribution protocols. As used herein, advertising of a route of a segment identifier includes advertising the fully expanded route, or a prefix corresponding to the segment identifier (e.g., the SR discriminator and SR node value, and possibly the SR function with or without an argument).

In one embodiment, one or more SR routers advertise a predetermined maximum or preferred number (e.g., for increased or maximum efficiency) of segment identifiers to include in a SR header that will be processed by the corresponding SR node. In one embodiment, such advertising identifies those SR nodes that gain processing and/or memory efficiencies when a SR header has only a small number of segment identifiers. In one embodiment, a value (e.g., number, flag, range) corresponding to a predetermined quantity is advertised.

In process block 264, SR (and other) network nodes continuously update their SR policies and/or routing information as required (e.g., based on information received via a routing protocol, from a network management system, etc.). Processing of the flow diagram of FIG. 2C is complete as indicated by process block 269.

Figure 3A:
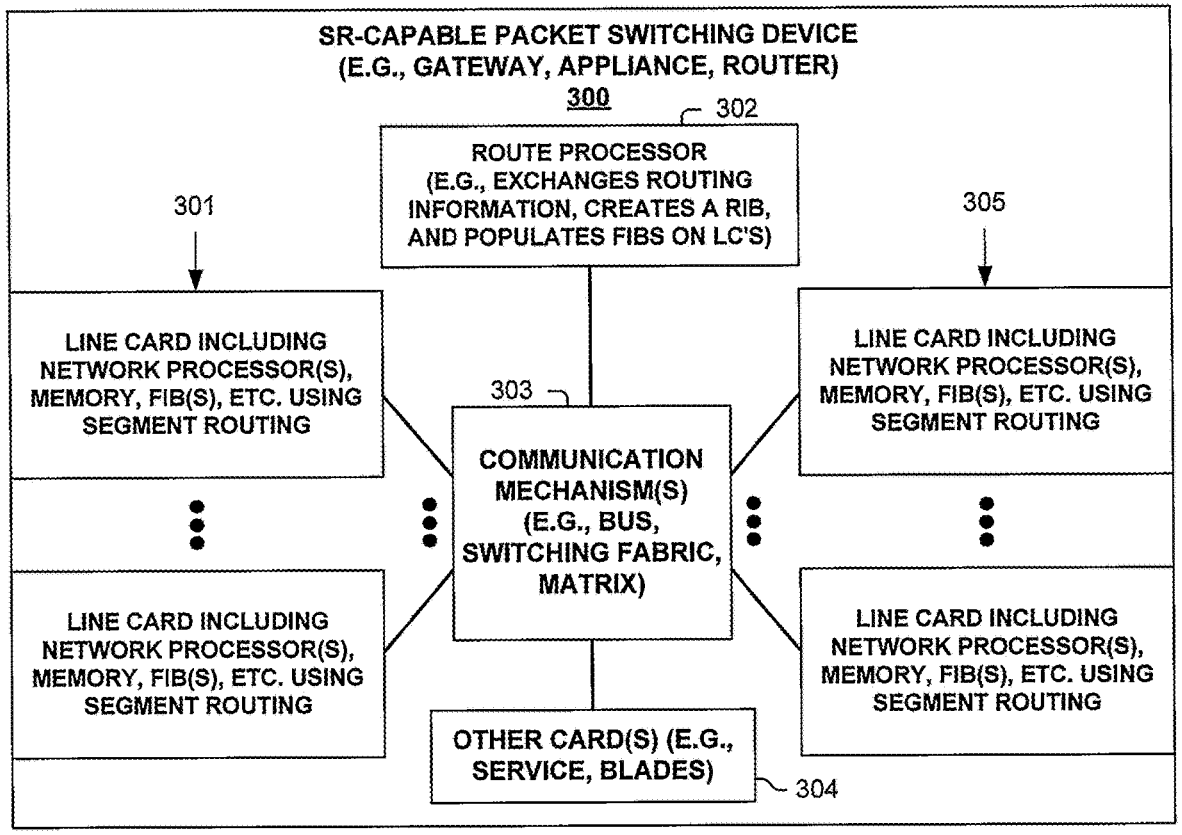
FIG. 3A illustrates a packet switching device according to one embodiment.
Figure 3B:
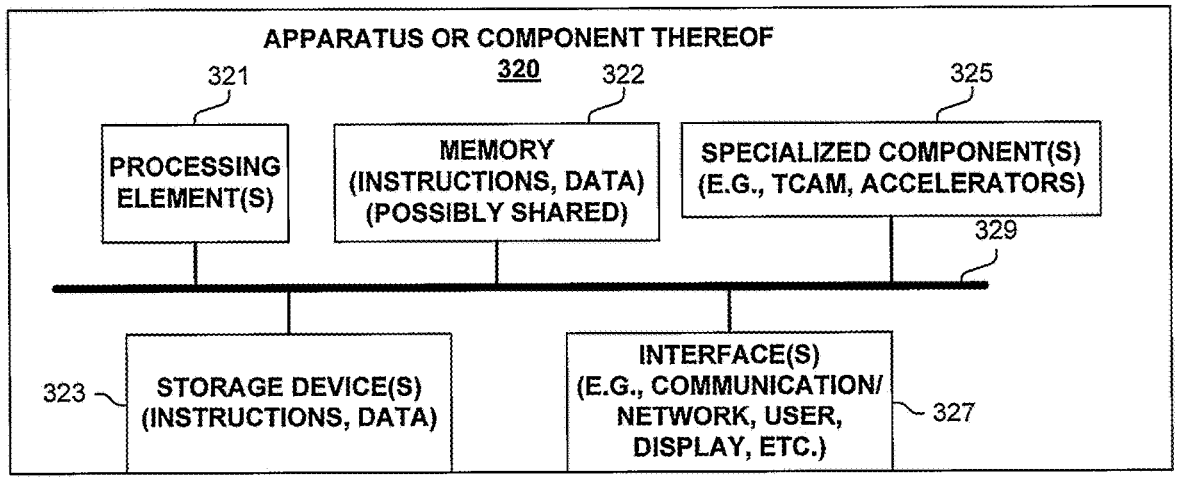
FIG. 3B illustrates an apparatus according to one embodiment.
Figure 3C:
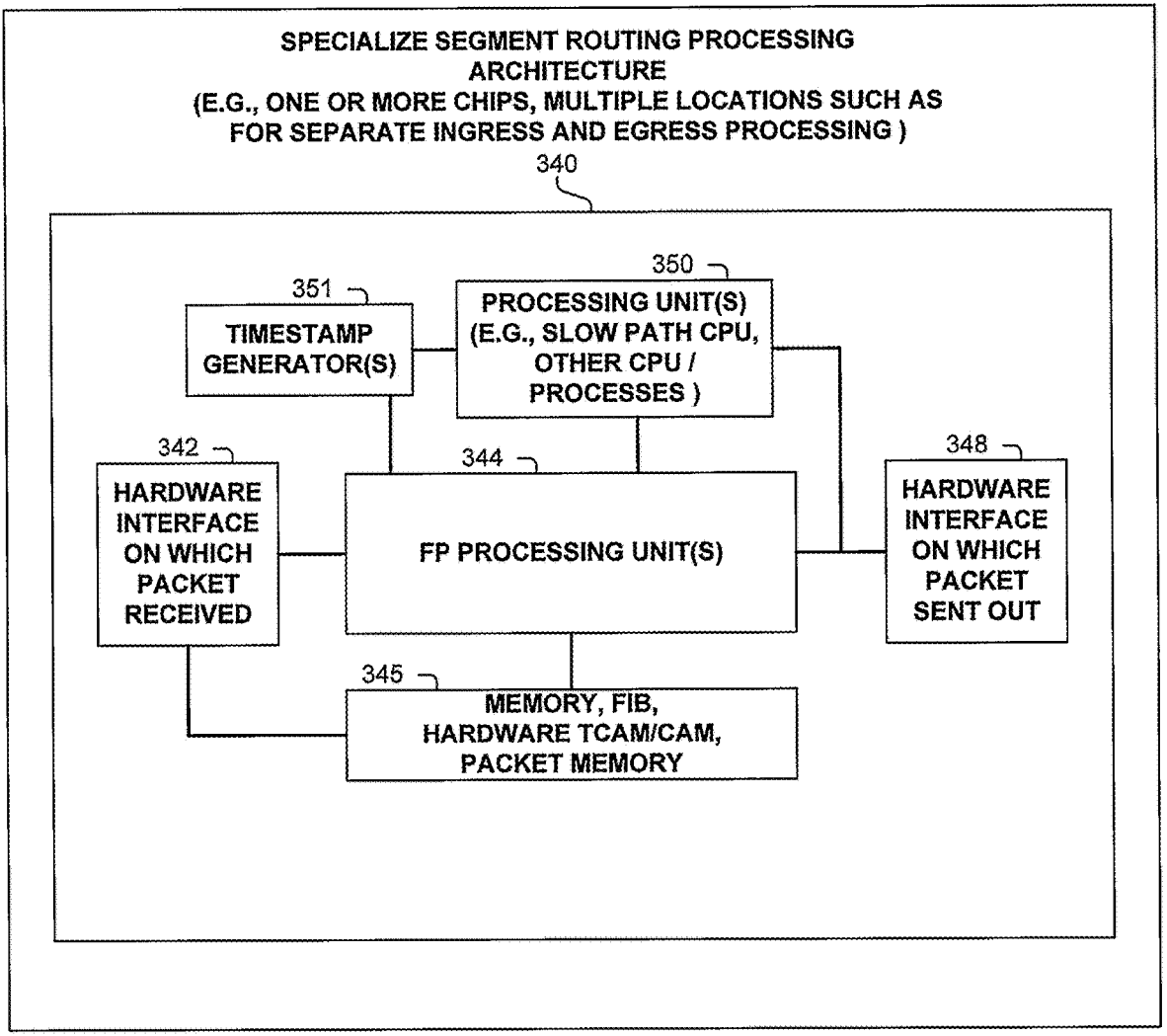
FIG. 3C illustrates specialized processing hardware according to one embodiment.

FIGS. 3A-C and their discussion herein provide a description of all or portions of various SR network nodes and OAM controllers according to one embodiment.

FIG. 3A illustrates one embodiment of a SR-capable packet switching device 300 (e.g., SR gateway, appliance, router, packet switching device, possibly with one or more service functions, and/or an OAM controller) according to one embodiment. As shown, packet switching device 300 includes multiple line cards 301 and 305, each with one or more network interfaces for sending and receiving packets over communications links (e.g., possibly part of a link aggregation group), and with one or more processing elements that are used in one embodiment associated with segment routing (SR) network processing of packets including operations signaling and processing of packets in manners providing processing and/or memory efficiencies. Packet switching device 300 also has a control plane with one or more processing elements 302 for managing the control plane and/or control plane processing of packets associated with segment routing (SR) network processing of packets including operations signaling and processing of packets in manners providing processing and/or memory efficiencies. Packet switching device 300 also includes other cards 304 (e.g., service cards, blades) which include processing elements that are used in one embodiment to process (e.g., forward/send, drop, manipulate, change, modify, receive, create, duplicate, perform SR gateway functionality possibly with shared memory with one or more service functions, apply a service according to one or more service functions) packets associated with segment routing (SR) network processing of packets including operations signaling and processing of packets in manners providing processing and/or memory efficiencies, and some hardware-based communication mechanism 303 (e.g., bus, switching fabric, and/or matrix, etc.) for allowing its different entities 301, 302, 304 and 305 to communicate. Line cards 301 and 305 typically perform the actions of being both an ingress and egress line card, in regards to multiple other particular packets and/or packet streams being received by, or sent from, packet switching device 300. In one embodiment, a SR gateway and service functions are implemented on a line card 301, 305.

FIG. 3B is a block diagram of an apparatus 320 used in one embodiment associated with segment routing (SR) network processing of packets including operations signaling and processing of packets in manners providing processing and/or memory efficiencies. In one embodiment, apparatus 320 performs one or more processes, or portions thereof, corresponding to one of the flow diagrams illustrated or otherwise described herein, and/or illustrated in another diagram or otherwise described herein.

In one embodiment, apparatus 320 includes one or more processor(s) 321 (typically with on-chip memory), memory 322 (possibly shared memory), storage device(s) 323, specialized component(s) 325 (e.g. optimized hardware such as for performing lookup and/or packet processing operations and/or service function, associative memory, binary and/or ternary content-addressable memory, etc.), and interface(s) 327 for communicating information (e.g., sending and receiving packets, user-interfaces, displaying information, etc.), which are typically communicatively coupled via one or more communications mechanisms 329 (e.g., bus, links, switching fabric, matrix), with the communications paths typically tailored to meet the needs of a particular application.

Various embodiments of apparatus 320 may include more or fewer elements. The operation of apparatus 320 is typically controlled by processor(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processor(s) 321 and/or data which is manipulated by processor(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processor(s) 321 and/or data which is manipulated by processor(s) 321 for implementing functionality in accordance with an embodiment.

FIG. 3C illustrates a specialized segment routing processing hardware architecture 340 according to one embodiment that performs hardware-based fast path packet processing of packets.

The terms "fast path" and "slow path" processing of packets are used herein consistently with the common meaning to one skilled in the art, as a packet is initially processed by a packet switching device (e.g., router) by optimized, hardware-based "fast path" processing, and upon some condition (e.g., segment routing OAM signaling in a packet), the packet is "punted" (e.g., communicated) to a different processing path called "slow path" processing which uses a general-purpose processor (e.g., by a centralized processing unit operating according to software instructions such as a route processor) to process the packet. As used herein, fast path processing excludes processing by general-purpose processor (e.g., by a centralized processing unit operating according to software instructions).

In one embodiment, fast path (FP) specialized hardware-based processing unit(s) 344, such as, but not limited to one or more application-specific integrated circuits or network processors typically operating according to fixed microcode (excluding processing by general-purpose processor) fast path process packets. Upon some condition (e.g., detection of segment routing OAM signaling), a packet is punted to slow path processing unit(s) 350 (e.g., to a generalize-purpose processor 350).

In one embodiment, the fast path processing of packets is designed for processing of packets quickly, such as, but not limited to, at a line rate. In one embodiment, packets that cannot be processed by the fast path processing in a line rate packet time or require extra information are punted (communicated) to slow path packet processing freeing up the fast path processing for a next packet. The fast path processing capabilities of one embodiment of a reduced-capability router or other network node does not allow for significant manipulation of a segment routing header within the allotted processing time, thus, such packets are punted to slow path processing.

As shown, hardware interface 342 receives packets which are stored in packet memory 345 (at least the packet payload), with lookup information (e.g., packet headers) being provided to fast path processing unit(s) 344. For each packet, fast path processing unit(s) 344, referencing a forwarding information base 345, determines forwarding information which is provided to fast path processing unit(s) 344. In addition, always or if the forwarding information so indicates, a hardware timestamp is acquired from timestamp generator(s) 351 indicating a current time, with the timestamp passed to fast path processing unit(s) 344. In one embodiment, forwarding information base 345 includes specialized hardware and/or data structures (e.g., hardware binary and/or ternary content-addressable memory, data structures in memory).

In one embodiment, fast path processing unit(s) 344 is specialized hardware that efficiently hardware processes including encapsulating a native packet into a segment routing packet (which includes adding one or more segment identifiers), updating a segment routing header of a segment routing packet, decapsulating a native packet from a segment routing packet, etc. If the packet is not dropped, fast path processing unit(s) 344 provides the segment routing or other packet to hardware interface 348 on which the packet is sent into the network according to forwarding information (e.g., identification of hardware interface 348 as the outbound interface, nexthop information). In one embodiment, fast path processing unit(s) 344 uses other specialized hardware and/or data structures 345 (e.g., hardware binary and/or ternary content-addressable memory, data structures in memory, packet memory) in determining forwarding information, generating the segment routing packet encapsulating the received native packet, etc.

In one embodiment, fast path processing unit(s) 344 punts (communicates to slow path processing) a packet (with a timestamp if already acquired) as needed to slow path processing unit(s) 350 for performing slow path processing of a packet and/or for performing other functionality (e.g., responding to ICMP echo request packets). In one embodiment, a slow path processing unit 350 may acquire a timestamp from timestamp generator(s) 351. In one embodiment, slow path processing unit(s) 350 performs the corresponding packet processing operations, such as, but not limited to, OAM processing of segment routing packets which may include sending OAM information to other processes or processing units 350, or sending information to an external device (e.g., OAM controller) directly, or via an egress lookup operation performed by processing unit 344, to hardware interface 348.

Figure 4A:
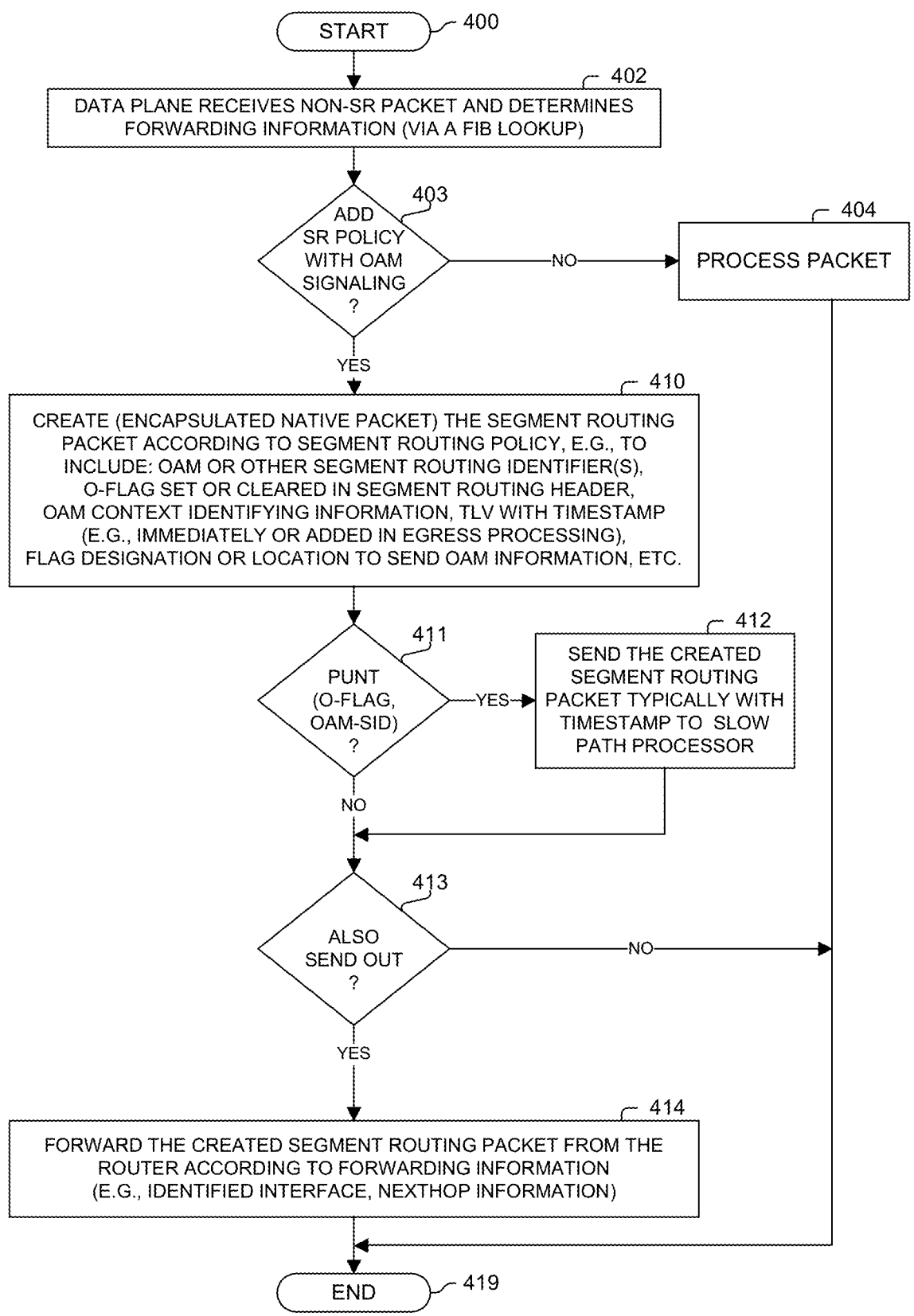
FIG. 4A illustrates a process according to one embodiment.

FIG. 4A illustrates a process according to one embodiment that processes a native packet received by a SR-capable node. Processing begins with process block 400. In process block 402, the data plane of a segment routing ingress/edge (or other) node receives a packet and determines forwarding information (e.g., via a FIB lookup operation). In one embodiment, the packet is a live user data traffic packet. As used herein live user data traffic packet refers to a packet that is an actual data traffic, and is not a probe or other network testing packet. For example, live user data traffic packets would include packets belonging to a streaming session, TCP communication session, voice or video call, etc., but excludes probe or other network testing packets.

As determined in process block 403, if a segment routing packet should be created to encapsulate the received native packet and the segment routing header is to include OAM signaling, then processing proceeds to process block 410; else the packet is processed normally in process block 404 and processing proceeds to process block 419.

Continuing in process block 410, the segment routing packet is created by fast path processing according to a segment routing policy with OAM signaling identified in the forwarding information. This forwarding information designates one or more OAM and/or other segment routing identifiers to be included in one or more segment routing headers, and might also designate to set or clear the O-Flag in a segment routing header, OAM context identifying information to be added to a segment routing header (e.g., in a time length value/TLV field) which can be used to uniquely identify a stream to which the received packet belongs or the received packet itself (e.g., for ease of correlation of OAM information collected from the packet as it traverses multiple SR-capable and possibly non-SR-capable nodes), to add an acquired timestamp in a segment routing header (e.g., in a TLV), a flag designating a location or a location address to which to send OAM information (e.g., identification of the packet, the packet itself, timestamp), etc.

Next, as determined in process block 411, if the created segment routing packet is to be punted to slow path processing (e.g., the O-Flag is set in a current segment routing header, the current segment identifier is an OAM segment identifier), then processing proceeds to process block 412, else to process block 413. Continuing in process block 412, the created segment routing packet typically along with an acquired timestamp is sent to a slow path packet processor and processing continues with process block 413. In one embodiment, fast path processing is used instead of slow path processing. Continuing and as determined in process block 413, if the packet is be sent from the SR-capable router by the fast path processing (including when a copy of the packet has been sent to slow path processing), then processing proceeds to process block 414; else processing proceeds to process block 419. In process block 414, the created segment routing packet is sent from the node according to egress forwarding information (e.g., identified interface, nexthop information). In one embodiment, fast path processing creates the segment routing packet, including inserting a hardware timestamp in a TLV of the segment routing header of the packet, with a subsequent segment routing node communicating the timestamp and other OAM information to an OAM controller, with slow path processing of the packet not being performed. Continuing, processing of the flow diagram of FIG. 4A is complete as indicated by process block 419.

Figure 4B:
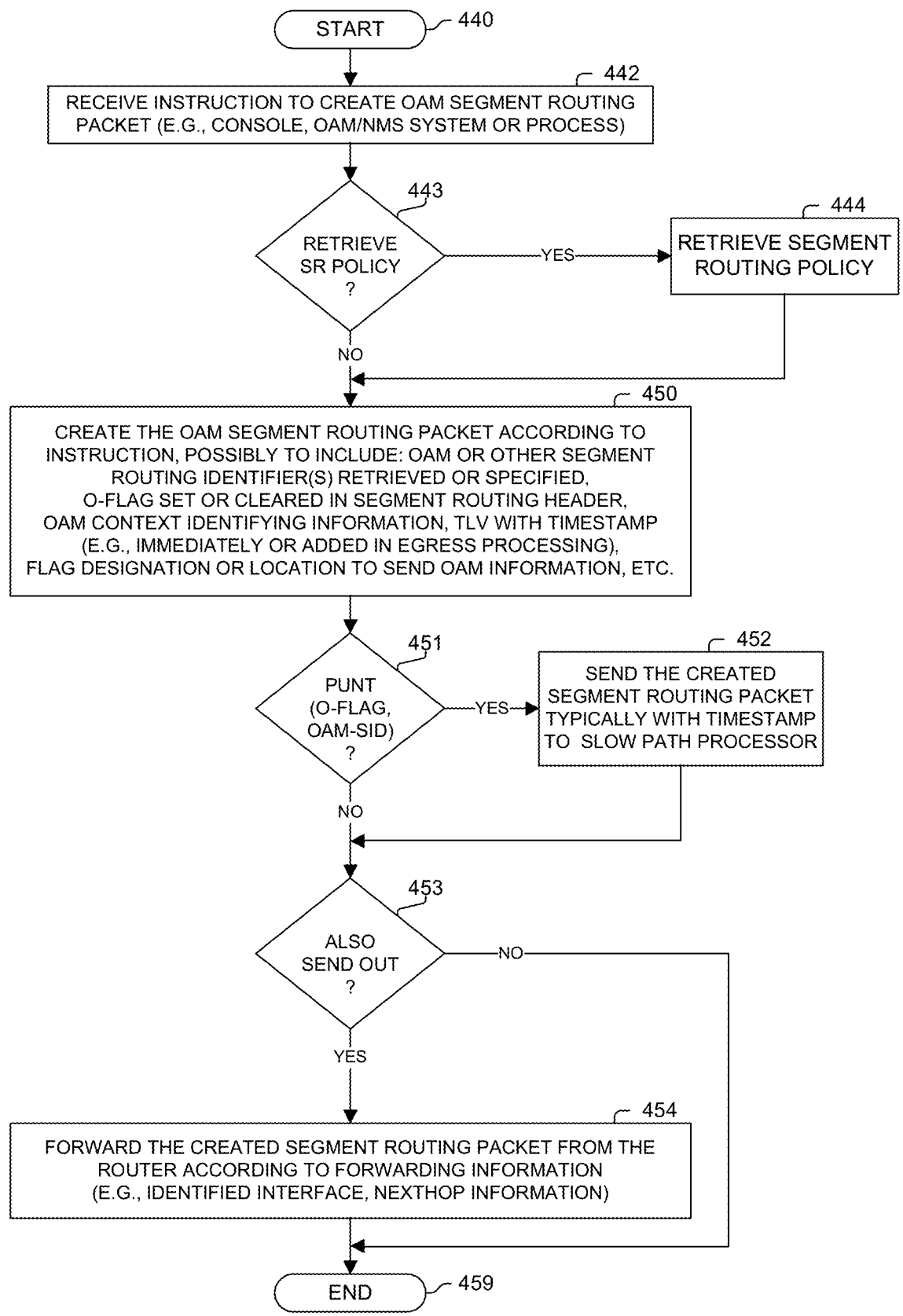
FIG. 4B illustrates a process according to one embodiment.

FIG. 4B illustrates a process to create a segment routing packet performed in one embodiment. Processing commences with process block 400. In process block 442, an instruction to create OAM segment routing packet is received (e.g., from a console, OAM or network management system or process, etc.). As determined in process block 443, if the instruction requires the retrieval of a corresponding segment routing policy, then processing proceeds to process block 444 wherein the segment routing policy is retrieved.

Next in process block 450, the OAM segment routing packet is created according to the received instruction, including to include OAM or other segment routing identifier(s) in a retrieved segment routing policy or specified by the instruction in one or more segment routing headers, to set or clear the O-Flag in a segment routing header, OAM context identifying information to be added to a segment routing header (e.g., in a time length value/TLV field) which can be used to uniquely identify a stream to which the created packet belongs or the created packet itself especially by an OAM controller in correlating multiple sets of OAM information acquired as the packet traverses a network, to add an acquired timestamp in a segment routing header (e.g., in a TLV) immediately or after egress processing, flag designating a location or a location address to send OAM information, etc.

Next, as determined in process block 451, if the packet is to be punted to slow path processing (e.g., the O-Flag is set in a current segment routing header, the current segment identifier is an OAM segment identifier for the current node), then processing proceeds to process block 452, else to process block 453. Continuing in process block 452, the created segment routing packet along with an acquired timestamp is sent to a slow path packet processor and processing continues with process block 453. In one embodiment, the packet is processed by fast path processing rather than slow path processing. Continuing, and as determined in process block 453, if the packet is to be sent from the SR-capable router by the fast path processing (including when sending a copy of the packet to slow path processing), then processing proceeds to process block 454; else processing proceeds to process block 459. In process block 454, the created segment routing packet is sent from the router according to forwarding information (e.g., identified interface, nexthop information). Continuing, processing of the flow diagram of FIG. 4B is complete as indicated by process block 459.

Figure 5:
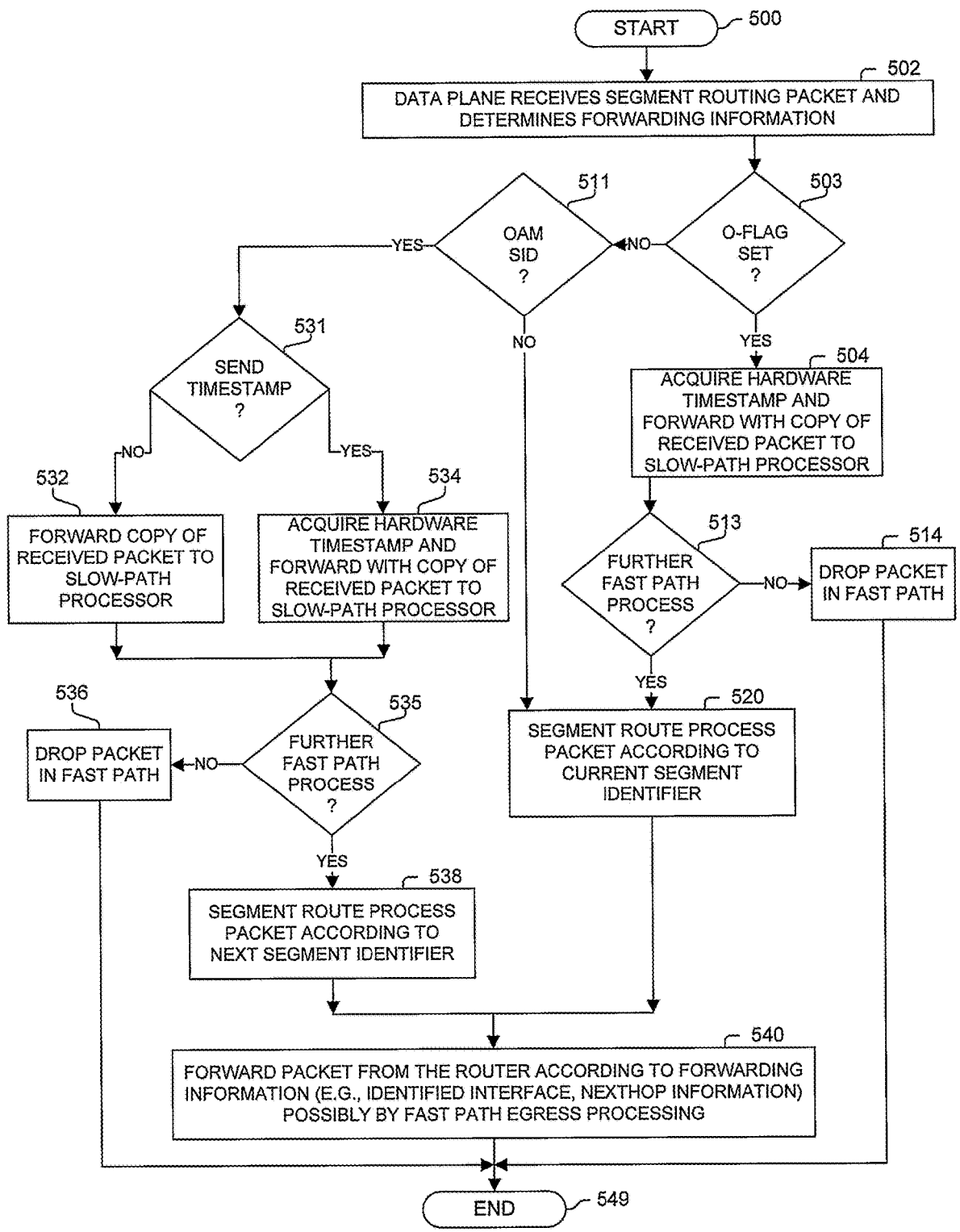
FIG. 5 illustrates a process according to one embodiment.

FIG. 5 illustrates segment routing fast path packet processing performed in one embodiment. Processing begins with process block 500. In process block 502, the data plane of a segment routing node receives a segment routing packet and determines forwarding information (e.g., via a FIB lookup operation based on a destination address of the IP packet, with destination address possibly being a local or global OAM or non-OAM segment identifier). This forwarding information may include a segment routing policy to adjust segment routing processing, possibly modifying OAM signaling information (e.g., clearing the O-Flag, adding one or more OAM or other segment identifiers to the received packet), modifying the list of segment identifiers in a segment routing header of the packet, etc. In one embodiment, if the current segment identifier is not for the local node that received the packet in process block 502, then the packet is dropped.

As determined in process block 503, if the O-Flag is set in the current segment routing header of the received segment routing packet, then processing proceeds to process block 504; else processing proceeds to process block 511.

Continuing with process block 504 and in response to the O-Flag being set (which is a decision typically independent of the value of a segment identifier) as determined in process block 503, the received segment routing packet is forwarded to slow path processing typically with an acquired current timestamp. As determined in process block 513, if the received segment routing packet is to be further processed by fast path processing (e.g., both fast path and slow path processing will process a copy of the received segment routing packet), then processing proceeds to process block 520; else the packet is dropped (e.g., not further processed) in process block 514 by fast path processing and processing proceeds to process block 549.

Continuing with process block 511, as determined therein, if the current segment identifier is an OAM segment identifier, then processing proceeds to process block 531; otherwise processing proceeds to process block 520.

Continuing with process block 520, the received segment routing packet is processed according to its current segment identifier, and processing proceeds to process block 540. In one embodiment, this processing may result in the packet being further processed by fast path and/or slow path processing.

As used herein, segment route processing typically includes performing an action corresponding to a current segment identifier, updating of the segment routing information of a packet in a segment routing header and an IP destination address of an IP segment routing packet, this updating may include removing a segment routing header such as when performing penultimate segment popping (PSP). In one embodiment, PSP is disabled (e.g., not performed) so that a segment routing packet (instead of a packet from the payload of the segment routing header) including OAM signaling (e.g., a set O-Flag) is sent to a next SR-capable node.

Continuing with process block 531, as determined therein, if the slow path processing is to receive a timestamp, then processing proceeds to process block 534 to forward a copy of the received segment routing packet with an acquired timestamp to slow path processing; otherwise, in process block 532 a copy of the received segment routing packet is forwarded to slow path processing (e.g., without a timestamp). Next, as determined in process block 535, if the received segment routing packet is to be further processed by fast path processing (e.g., both fast path and slow path processing will process a copy of the received segment routing packet), then processing proceeds to process block 538; else the packet is dropped (e.g., not further processed) in process block 536 by fast path processing and processing proceeds to process block 549.

In one embodiment, the received segment routing packet is dropped (in process block 536) if the next segment identifier (after the current, OAM segment identifier) is not associated with the SR node performing this processing (e.g., based on the SR locator) (as determined in process block 535). Continuing with process block 538, the received segment routing packet is segment route processed according to the next segment identifier in the order of the segment identifiers, and processing proceeds to process block 540.

Continuing in process block 540, the processed packet is forwarded from the router according to forwarding information (e.g., identified interface, nexthop information).

Continuing, processing of the flow diagram of FIG. 5 is complete as indicated by process block 549.

Figure 6:
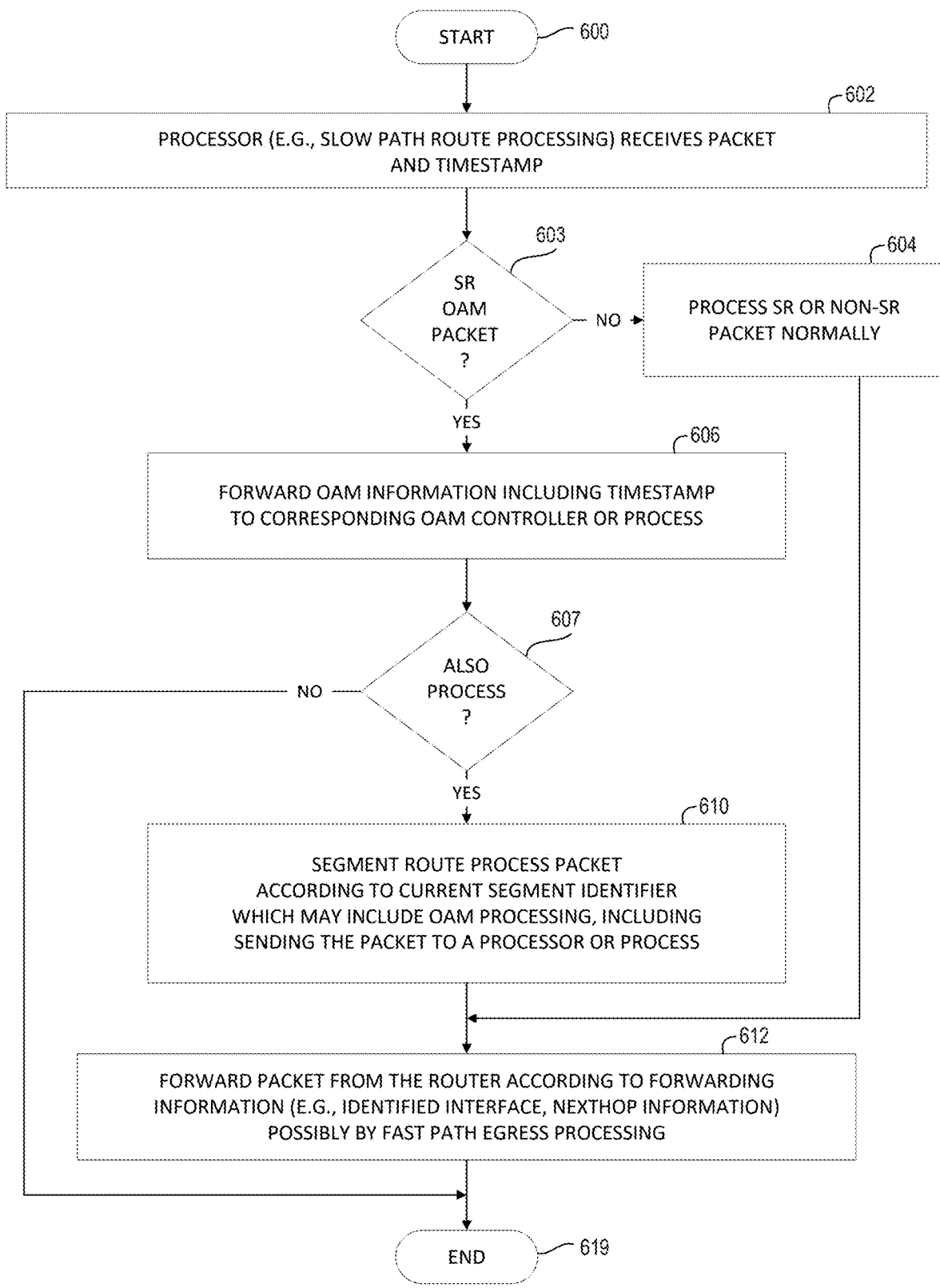
FIG. 6 illustrates a process according to one embodiment.

FIG. 6 illustrates a process to slow path process a packet as performed in one embodiment. Processing begins with process block 600. In process block 602, a processor of the slow path processing receives a packet, typically with a timestamp. As determined in process block 603, if the packet is identified as a segment routing packet to be OAM processed, then processing proceeds to process block 606; otherwise, the packet is processed normally in process block 604 and processing proceeds to process block 612.

Continuing with process block 606, OAM information, typically including the timestamp, is forward to a corresponding OAM controller or process to take further action (e.g., send OAM information to a designated local or remote process or controller, providing an Internet Control Message Protocol/ICMP echo request to an ICMP process on the node which then sends an ICMP echo response, or to another process to provide a response to a different probing request).

Next, as continued in process block 607, if the slow path is to further process the received packet (e.g., it is not dropped in process block 606), then in process block 610, the received packet is segment route processed according to a current segment identifier with may include further OAM processing, including sending a copy of the packet to an OAM processor or process, sending the packet to be fast path processed. Processing proceeds to process block 612.

Continuing in process block 612, the processed packet is forwarded from the node according to forwarding information (e.g., identified interface, nexthop information), possibly including fast path egress processing to identify this egress forwarding information.

Continuing, processing of the flow diagram of FIG. 6 is complete as indicated by process block 619.

Figure 7:
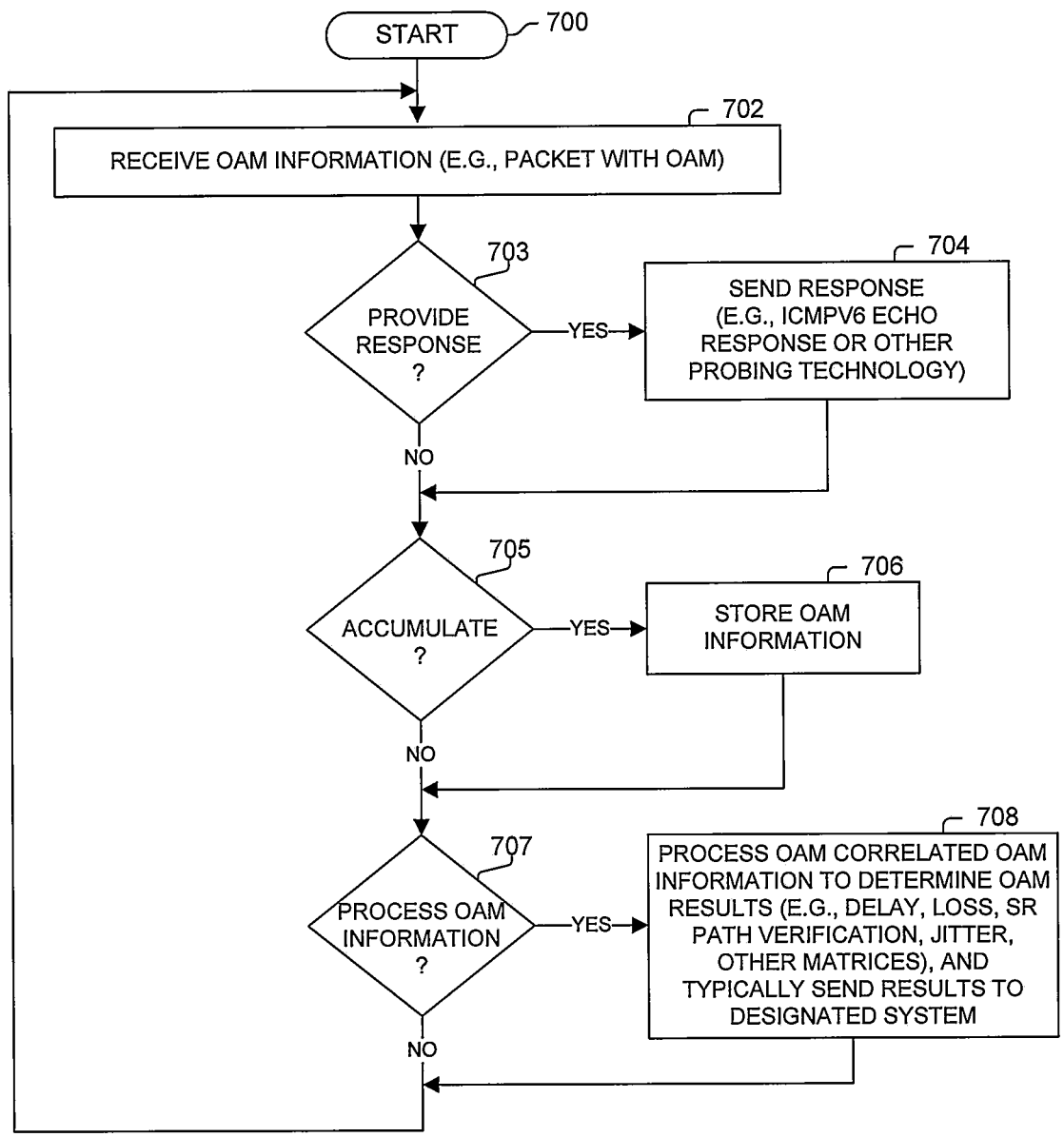
FIG. 7 illustrates a process according to one embodiment.

FIG. 7 illustrates OAM processing process performed by an OAM controller (e.g., processor or process) on a local or remote node according to one embodiment. Processing begins with process block 700. In process block 702, OAM information is received (e.g., a packet with OAM signaling or via some other format or mechanism), typically including a timestamp associated therewith).

As determined in process block 703, if the OAM controller is to provide a response based on the received packet, including that the packet encapsulates an ICMP echo or other probing request, then in process block 704, a response packet is created and sent to the requester. In one embodiment, this OAM controller includes an ICMPv6 process running in a segment routing node.

As determined in process block 705, if the OAM controller is to accumulate OAM information (e.g., packet identifying information, possibly added OAM context identifying information, and timestamp) for subsequent correlation and processing, then in process block 706, the OAM controller stores this information in a data structure, typically optimized for retrieving OAM information for a packet or a stream of packets.

As determined in process block 707, if the OAM controller is to currently process acquired OAM information, then in process block 708, the OAM controller correlates and processes accumulated OAM information to determine OAM results (e.g., delay, loss, SR path verification, jitter, other matrices) for a packet or stream of packets.

In one embodiment, the OAM information received includes, but is not limited to, one or more timestamps, packet identifying information, identification of the segment routing node providing the OAM information, etc. In one embodiment, the OAM information received from multiple segment routing nodes is correlated to a same particular packet (or stream of packets) based on one or more fields of the packet included in the received OAM information (e.g., address, segment identifier, information in a segment routing header) with may include OAM context identifying information added to a segment routing packet for such correlation (e.g., a same identifying or deterministic value for uniquely identifying OAM information associated with the same packet). In one embodiment, the received OAM information is used to verify that the packet traversed the nodes of a segment routing policy and possibly to determine associated delays and/or other metrics based on the associated timestamps. These OAM results are typically provided to a default or designated local or remote system or process. Processing returns to process block 702.

Many scenarios require punting of SRv6 OAM packets at the desired nodes in the network. Ping to a remote SID, performance management, proof-of-transit, network troubleshooting, etc. are among the use cases that require punting of the OAM packet. The interception and punting may be necessary at the egress node and/or at a selected/arbitrary transit node.

Just like the clean bit (which has been depreciated), OAM operation is also a Function. One embodiment includes basic OAM SID function(s). One embodiment is described in relation to Segment Routing terminology, and also using the following terms.

An::OP to represent the special OAM SID function to implement the punt behavior, where An is the locator part of the SID.

An::OTP to represent the special OAM SID function to implement the timestamp and punt behavior, where An is the locator part of the SID.

An::OTPF to represent the special OAM SID function to implement the punt a copy of the packet with timestamp and forward behavior, where An is the locator part of the SID.

Figure 8:
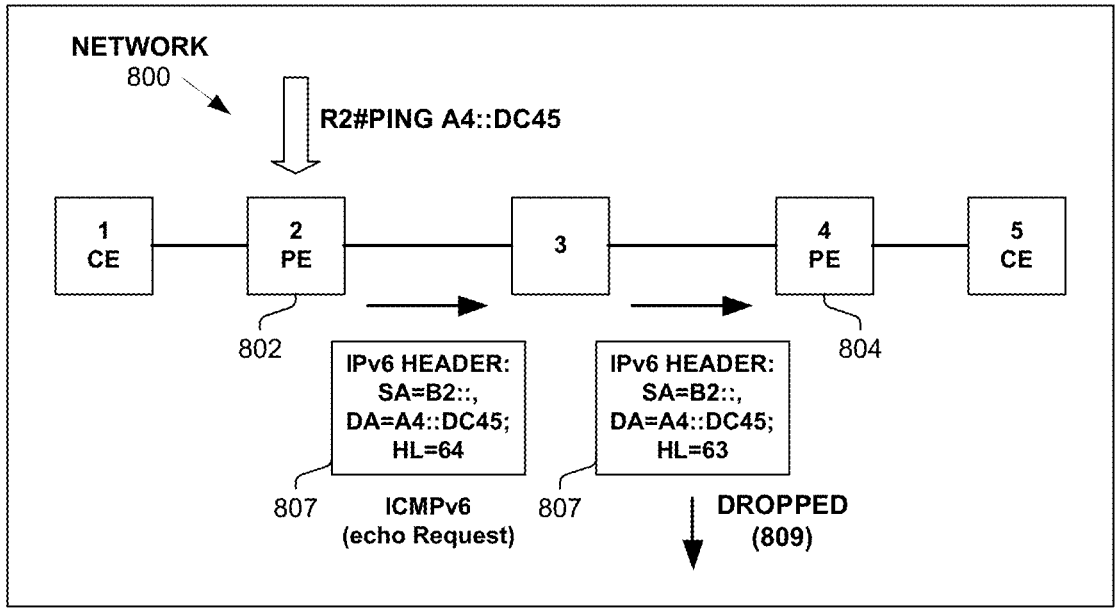
FIG. 8 illustrates a network operating according to one embodiment.

In an SRv6 network 800 shown in FIG. 8, a user would like to ping a remote SID function (e.g., A4::DC45 on network node 804), i.e., would like to validate if a SID Function at a remote node is programmed and is valid. The validation can be initiated from anywhere in the network, e.g., from a remote node (e.g., network node 802) or a controller. However, the egress network node 804 drops (809) any such ping request packet 807 and ping always fails. This is exemplified in the FIG. 8, where user is trying to ping a remote SID function, A4::DC45, from node 802, where A4::DC45 is an END.DX4 SID at the remote node 804. When the packet arrives, Egress node 804 drops (809) the packet 807. This is because forwarding chain at the Egress is incomplete, and the ping to a SID function is performed without punting.

One embodiment implements a ping to a SID function that uses punting at the target node.

One embodiment uses OAM SIDS. Local SID allocation refers to the allocation of an "opcode" (FUNC) within a given locator context. In current implementation plan,
Opcode 0 reserved as Invalid.
Opcode 1-63 reserved:
  Opcode 1 and 2 are reserved for default END functions with PSP and USP support respectively.
  Opcode 3-63 are unassigned for future use.

One embodiment uses opcodes from the reserved (3-63) range to encode the special OAM SID(s).

One embodiment uses the argument field to provide data to a function and/or to communicate information between network nodes.

Figure 9:
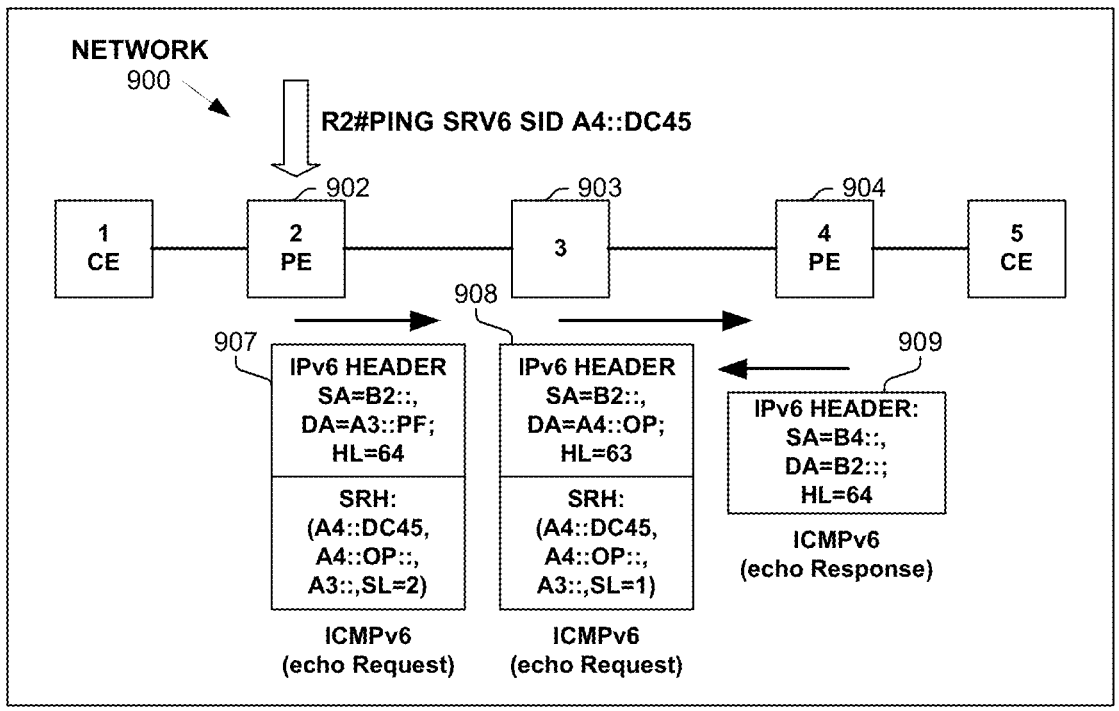
FIG. 9 illustrates a network operating according to one embodiment.

Use of the OAM SID is exemplified using an example of pinging a SID function in SRv6 network 900 of FIG. 9. In the following, the user wants to ping a SID function, A4::DC45 on network node 904, from network node 902. As noted above, this ping requires punting at network node 904. To exercise OAM punting at node 904, the special OAM SID, A4::OP, has been added to the SRH in packet 907 before the target A4::DC45 SID.

When the node 904 receives the packet 908 (sent from node 903 after SR processing packet 907), OAM SID Function A4::OP::forces OAM packet punting on node 904. Slow path at node 904 can now respond to the ICMP ping request message by sending packet 909.

In one embodiment, the same technique is used to punt an OAM packet at any selected node by inserting An::OP SID in front of the target SID function.

In one embodiment, Each entry of the "My Local SID Table" indicates the function associated with the local SID. One embodiment includes, but is not limited to, using the following OAM functions associated to a SID.
  END.OP—OAM Endpoint with Punt
  END.OTP—OAM Endpoint with Timestamp and Punt
  T.OTPF—OAM Transit with Timestamp, Punt and Forward END.OP: OAM Endpoint with Punt The END.OP (OAM Endpoint with Punt) is the most basic OAM function.

When N receives a packet whose IPv6 DA is S and S is a local END.OP SID, N does:
  1. Punt packet to CPU for processing in software (slow-path). ;; Ref1
  Ref1: Hardware (ucode) just punts the packet. There is no requirement for the hardware to manipulate any TLV in SRH (or elsewhere). Software (slow path) implements the required OAM mechanism.

Please note that use of END.OP SID in SRH segment list does not require any changes to PSP behavior.

END.OPT: OAM Endpoint with Timestamp and Punt

The "OAM Endpoint with Timestamp and Punt" function (End.OPT for short) is a variant of the END.OP function. ENP.OPT can be used for performance management data collection at an arbitrary SRv6 node.

When N receives a packet whose IPv6 DA is S and S is a local END.OPT SID, N does:
  1. Timestamp the packet. ;; Ref1
  2. Punt the time-stamped packet to CPU for processing in software (slow-path). ;; Ref2
Ref1: Timestamping is done ASAP at the ingress pipeline (in hardware).

Ref2: Hardware (ucode) just punts the packet. There is no requirement for the hardware to manipulate any TLV in SRH (or elsewhere). Software (slow path) implements the required OAM mechanism.

In one embodiment, the timestamp is placed in the punt header or another location.

END.OTPF: OAM Transit with Timestamp, Punt and Forward

The "OAM Transit with Timestamp, Punt and Forward" function (End.OTPF for short) is used to implement punt and forward behavior.

When N receives a packet whose IPv6 DA is S and S is a local T.OTPF SID, N does:
  1. Timestamp the packet.
  2. Punt the time-stamped packet to CPU for processing in software (slow-path). ;; Ref1
  3. decrement SL.
  4. IF SRH[SL] is not a local SID THEN drop the packet. ;; Ref2
  5. continue with execution of the local SID function at SRH[SL].
Ref1: Hardware (ucode) just punts the packet. There is no requirement for the hardware to manipulate any TLV in SRH (or elsewhere). Software (slow path) implements the required OAM mechanism.
Ref2: The function at SRH[SL] must be a local SID owned by N.

T.OTPF Example

Use of T.OTPF is illustrated using the following SR Policy.
  (A, S1::F1)(S3::F3, S2::F2, S1::F1, SL=2)

Consider how packet needs to be modified in order to implement the "punt and forward" behavior at each segment of the following SR-Policy. To collect performance data from all SIDs in the sid-list, the ingress needs to insert the OTPF SID in front of all SIDs in the sid-list, as shown in the following,
  (A, S1::OTPF), (S3::F3, S3::OTPF, S2::F2, S2::OTPF, S1::F1, S1::OTPF)

OAM "Punt and Forward" Using SRH.Flags.O-Bit

Please note that the use of T.OTPF Function may double the SRH stack size. To address the SRH stack size increase issue, an alternate of using the "0-bit" to define the "punt and forward" OAM function is defined here. The following instructions are inserted at the beginning of the pseudo-code for all SID Functions.

When N receives a packet whose IPv6 DA is S and S is a local SID, N first executes the following the pseudo-code,
  IF NH=SRH and SL>0 and SRH.Flags.O-bit is True THEN
    a. Timestamp the packet
    b. Punt the time-stamped packet to CPU for processing in software (slow-path). ;; Ref1
    c. continue with execution of the function S;; Ref2
Ref1: Hardware (ucode) just punts the packet. There is no requirement for the hardware to manipulate any TLV in SRH (or elsewhere). Software (slow path) implements the required OAM mechanism.
Ref2: S is a local SID and executed based on [ID.draft-filsfils-spring-srv6-network-programming].

The use of OAM "punt and forward" using SRH.Flags.O-bit requires additional change to disable PSP behavior using the following pseudo code.

Disabling PSP when SRH.Flags.O-Bit is Set

The following change needs to be implemented for all SID Functions.

After the instruction 'update the IPv6 DA with SRH[SL]' is executed, the following instructions must be added:
IF updated SL=0 and PSP is TRUE and SRH.Flags.O-bit is False
  THEN pop the top SRH. ;; Ref1
Ref1: PSP behavior is disabled when SRH.Flags.O-bit is set.

In summary, in one embodiment, segment routing (SR) network processing of packets is performed which includes operations signaling and processing of packets in manners providing processing and/or memory efficiencies. One embodiment includes acquiring a segment routing particular packet by a particular router in a network. Responsive to the particular router data plane ascertained during fast path processing by a fast path processing unit that the segment routing particular packet is to be Operations, Administration, and Maintenance (OAM) processed by a different processing unit in the particular router, communicating a timestamp of a current time and the segment routing particular packet including a segment routing header that includes OAM signaling from said fast path processing to the different processing unit, with fast path processing being hardware-based packet processing by the fast path processing unit. The segment routing particular packet is OAM processing by the different processing unit. The use of OAM SIDs enable a controller or any node in the network to collect OAM/PM data from an arbitrary node or a set of arbitrary nodes in the network. This may be viewed as a more powerful construct than use of a global OAM bit (e.g., SRH.Flags.O-bit).

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving a segment routing packet by a router in a network;
responsive to a router data plane ascertaining during fast path processing by a fast path processing unit based on an Operations, Administration, and Maintenance (OAM) segment identifier (SID) of the segment routing packet that the segment routing packet is to be OAM processed, communicating the segment routing packet for remote processing, with fast path processing being hardware-based packet processing by the fast path processing unit; and
transmitting the segment routing packet for remote processing,
wherein the segment routing packet is an Internet Protocol version 6 (IPv6) packet including an IPv6 header, the IPv6 header including an IPv6 Destination Address,
wherein the IPv6 Destination Address includes the OAM SID, and
wherein responsive to the OAM SID identifying timestamp behavior, the fast path processing unit communicating a timestamp of a current time along with the segment routing packet.

2. The method of claim 1, wherein the OAM SID includes an identification of an END.OTP endpoint with timestamp and punt function.

3. The method of claim 2, wherein a segment list of the segment routing packet includes the OAM SID.

4. The method of claim 1, wherein the OAM SID includes an identification of END.OTPF endpoint with punt and forward function.

5. The method of claim 4, wherein a segment list of the segment routing packet includes the OAM SID.

6. The method of claim 1, wherein a segment list of the received segment routing packet includes the OAM SID.

7. The method of claim 1, wherein the OAM SID includes an OAM argument value, comprising one or more bits, qualifying the OAM processing designated by a segment routing function value in the OAM.

8. The method of claim 1, wherein transmitting the segment routing packet includes sending a timestamp and identifying information of the segment routing packet via the network.

9. The method of claim 8, further comprising:
another segment router in the network OAM processing of the segment routing packet, including sending another timestamp and packet identifying information related to the segment routing packet; and
receiving and processing the timestamp and the identifying information and the another timestamp and the packet identifying information and to determine a result including delay, loss, segment routing path verification, or jitter.

10. An apparatus, comprising:
one or more hardware interfaces sending and receiving packets with a network; and
a fast path packet processing unit performing hardware-based packet processing,
wherein the apparatus performs packet processing operations including segment routing-capable (SR-capable) packet processing operations, with the packet processing operations including:
receiving a segment routing packet;
responsive to a router data plane ascertaining during fast path processing by a fast path processing unit based on an Operations, Administration, and Maintenance (OAM) segment identifier (SID) of the segment routing packet that the segment routing packet is to be OAM processed, communicating the segment routing packet for remote processing, with fast path processing being hardware-based packet processing by the fast path processing unit; and
transmitting the segment routing packet for remote processing,
wherein the segment routing packet is an Internet Protocol version 6 (IPv6) packet including an IPv6 header, with the IPv6 header including an IPv6 Destination Address,
wherein the IPv6 Destination Address includes the OAM SID; and
wherein responsive to the OAM SID identifying timestamp behavior, the fast path processing unit communicating a timestamp of a current time along with the segment routing packet.

11. The apparatus of claim 10, wherein the OAM SID includes an identification of an END.OTP endpoint with timestamp and punt function.

12. The apparatus of claim 11, wherein a segment list of the segment routing packet includes the OAM SID.

13. The apparatus of claim 10, wherein the OAM SID includes an identification of END.OTPF endpoint with punt and forward function.

14. The apparatus of claim 13, wherein a segment list of the segment routing packet includes the OAM SID.

15. The apparatus of claim 10, wherein a segment list of the received segment routing packet includes the OAM SID.

16. The apparatus of claim 10, wherein the OAM SID includes an OAM argument value, comprising one or more bits, qualifying the OAM processing designated by a segment routing function value in the OAM SID.

17. The apparatus of claim 10, wherein the OAM processing includes sending a timestamp and identifying information of the segment routing packet via the network.

18. The apparatus of claim 17, further comprising:
another segment router in the network OAM processing of the segment routing packet, including sending another timestamp and packet identifying information related to the segment routing packet;
receiving and processing the timestamp and the identifying information and the another timestamp and the packet identifying information and to determine a result including delay, loss, segment routing path verification, or jitter.

19. At least one non-transitory computer-readable medium storing instructions, which when executed by at least one processor of a network device, causes the at least one processor to:

receive a segment routing packet;
responsive to a router data plane ascertaining during fast path processing by a fast path processing unit based on an Operations, Administration, and Maintenance (OAM) segment identifier (SID) of the segment routing packet that the segment routing packet is to be OAM processed, communicating the segment routing packet for remote processing, with fast path processing being hardware-based packet processing by the fast path processing unit; and
transmitting the segment routing packet for remote processing,
wherein the segment routing packet is an Internet Protocol version 6 (IPv6) packet including an IPv6 header, with the IPv6 header including an IPv6 Destination Address,
wherein the IPv6 Destination Address includes the OAM SID, and
wherein responsive to the OAM SID identifying timestamp behavior, the fast path processing unit communicating a timestamp of a current time along with the segment routing packet.

20. The non-transitory computer-readable medium of claim 19, wherein the OAM SID includes an identification of an END.OTP endpoint with timestamp and punt function.

* * * * *